United States Patent Office 3,715,381
Patented Feb. 6, 1973

3,715,381
POLYISOCYANATE COMPOSITIONS STABILIZED AGAINST DISCOLORATION
Richard G. Spaunburgh, Elma, and John B. Hino, Cheektowaga, N.Y., assignors to Allied Chemical Corporation, New York, N.Y.
No Drawing. Filed June 11, 1969, Ser. No. 832,420
Int. Cl. C07c *119/04*
U.S. Cl. 260—453 P                                    7 Claims

ABSTRACT OF THE DISCLOSURE

Organic polyisocyanate compositions are stabilized against discoloration by having incorporated therein from about 0.0001 to 0.003 percent by weight of 2,6-di-tert-butyl-p-cresol as stabilizer therefor.

This invention relates to polyisocyanate compositions stabilized against discoloration by incorporation therein of an extremely small amount of 2,6-di-tert-butyl-p-cresol.

Organic polyisocyanates have achieved considerable commercial importance in recent years, primarily as reactants with polyfunctional compounds such as polyols in the preparation of polyurethanes for the manufacture of foams, fibers, coatings, films, elastomers, and castings. However, polyisocyanates tend to discolor during storage periods even at ambient temperatures. This tendency is particularly marked when the compounds are maintained at elevated temperatures. For example, in the preparation of polyurethanes it is frequently desirable to melt solid isocyanates at elevated temperatures and to maintain them in a molten state prior to use in order that they may be readily mixed with other reactants, such as polyols, in the liquid state. In other instances it is frequently desirable to preheat the isocyanate to obtain higher rates of reaction with other reactants. At such elevated temperatures most isocyanates discolor rapidly, unless they are stabilized.

Several stabilizers have been suggested to control the discoloration of organic isocyanates. Phenols and substituted phenols have been suggested in amounts of from 0.005% to 5% by weight. Although this amount of stabilizer has been suggested, the usual amount employed however is usually at least 0.01% to 0.10% to obtain a satisfactory degree of protection against discoloration. It is desirable, when adding stabilizers or other additives, for reasons of economy as well as the properties of the final product, to incorporate the smallest amount of such additives that will effectively accomplish the intended function. It is particularly desirable in the case of organic isocyanates to incorporate minuscule quantities of such additives to avoid contamination of the isocyanate and to avoid any adverse effect on the normal subsequent use of the isocyanate.

It has been discovered that organic polyisocyanates can be effectively stabilized against discoloration even at elevated temperatures for prolonged periods of time by the addition of 2,6-di-tert-butyl-p-cresol in extremely small amounts. It has further been discovered that the degree of stability provided by such minuscule amounts of stabilizers is substantially the same as that realized when employing amounts of the same stabilizer that are up to 100 times greater than the amount employed herein. In view of the prior art usage of considerably higher concentrations of phenolic stabilizers, it is indeed surprising to find that the minuscule amounts of stabilizer employed herein are effective to control discoloration of organic isocyanates. It is particularly surprising since other phenolic-type compounds are not effective to prevent discoloration after prolonged storage when employed at the same concentration level.

In accordance with the present invention, organic polyisocyanates are effectively stabilized against discoloration on storage, even at elevated temperatures by incorporating therein from about 0.0001 to .003 percent by weight of 2,6-di-tert-butyl-4-methyl phenol based on the weight of the polyisocyanate. The lower limit of this range is selected on the basis of convenience and in consideration of the difficulty involved in utilizing concentrations smaller than 1 part per million. Greater amounts than 30 parts per million only increases the cost of stabilizing the isocyanate without providing any substantial benefits in terms of prolonged stability. The use of 30 parts per million or less of the stabilizer also avoids any possibility of adversely affecting the properties of the isocyanate by the addition of unnecessarily high amounts of additive. Preferably, from about 1 to 10 parts per million, 0.0001 to 0.001 percent by weight, of the additive are employed.

The stabilized polyisocyanate compositions may be conveniently prepared by simple mixing of the color stabilizer and the desired polyisocyanate. If desired, a suitable solvent may be used to aid in the preparation of a homogenous mixture. In addition, if desired, elevated temperatures and mechanical mixing means may be employed. However, at the extremely low concentrations at which the present color stabilizer may be employed such elevated temperatures and solvents will normally not be necessary.

The color stabilization achieved in accordance with the present invention is applicable broadly to organic polyisocyanates, including both aromatic, aliphatic and cycloaliphatic isocyanates. Thus for example there may be used ethylene diisocyanate,
tetramethylene diisocyanate,
hexamethylene diisocyanate,
decamethylene diisocyanate,
cyclohexyl diisocyanate,
4,4'-methylenebis (cyclohexyl isocyanate),
m-phenylene diisocyanate,
p-phenylene diisocyanate,
tolylene-2,4-diisocyanate,
tolylene-2,6-diisocyanate,
4,4'-methylenebis (phenyl isocyanate),
tolylene-2,4,6-triisocyanate,
monochlorobenzene-2,4,6-triisocyanate,
2,3,5,6-tetramethyl-p-phenylene diisocyanate,
xylene diisocyanate and the like mixtures thereof. Tolylene-2,4-diisocyanate, tolylene-2,6-diisocyanate or mixtures thereof and 4,4'-methylenebis (cyclohexyl isocyanate) are preferred herein.

The stabilized polyisocyanate compositions thus prepared are extremely resistant to discoloration on storage even at elevated temperatures, and may be employed in any of the usual commercial applications for polyisocyanates, for example, in reactions with polyfunctional compounds, such as polyols, in the production of polyurethanes for use in the preparation of films, fibers, foams, elastomers and the like.

To further illustrate the present invention in the manner in which it may be practiced the following specific examples are set forth. In the examples, unless otherwise indicated, all parts and percentages are by weight and all temperatures are in centigrade degrees.

EXAMPLE 1

Several portions of technical tolylene diisocyanate (a mixture of approximately 80 parts 2,4- and 20 parts 2,6-tolylene diisocyanates) were placed in glass containers.

To each diisocyanate sample, a small amount of 2,6-di-tert-butyl-p-cresol was added with simple mixing to provide compositions containing the concentrations of additive as shown below. For purposes of comparison similar samples were prepared substituting various concentrations of catechol as the additive. A sample of the same diisocyanate with no additive was used as a control. The glass containers were sealed and placed in a constant-temperature oven maintained at 70 degrees. The color of the samples was determined after various periods of time as indicated below using the Hazen (cobalt-platinum) scale as described on pages 87–89 of "Standard Methods for the Determination of Water, Sewerage, and Industrial Wastes" (10th ed. 1955 published by the American Public Health Association). The results were as follows:

| Stabilizer | Concentration (parts per million) | Color (Hazen Units) | | | | |
|---|---|---|---|---|---|---|
| | | Initial | 1 day | 4 days | 7 days | 2 wks. |
| 2,6-di-tert-butyl-p-cresol | 1,000 | 30 | 30 | 30 | 40 | 45 |
| | 100 | 35 | 45 | 50 | 50 | 55 |
| | 20 | 55 | 60 | 60 | 75 | 95 |
| 5,5'-methylenebis(2-hydroxy-3-tertbutyl toluene | 1,000 | 50 | 60 | 60 | 60 | 65 |
| | 100 | 35 | 45 | 50 | 55 | 75 |
| | 20 | 55 | 65 | 70 | >200 | |
| Catechol | 1,000 | 30 | 35 | 35 | 55 | >200 |
| | 100 | 35 | 35 | 110 | 140 | >175 |
| None | | 35 | 90 | 150 | | |

As will be seen in the foregoing data the unstabilized sample of tolylene diisocyanate discolored rapidly under test conditions. In addition, it will be seen that catechol, a known stabilizer for diisocyanates, is relatively ineffective at the concentrations employed in accordance with the present invention whereas 2,6-di-tert-butyl-p-cresol, at the same low concentrations not only effectively stabilized diisocyanate against discoloration even after fourteen days of storage at 70° but the degree of stability attained was substantially the same as that realized when employing an amount 10 times greater than the minuscule amount of the invention.

EXAMPLE 2

Samples of tolylene diisocyanate stabilized with 1 part per million and 10 parts per million of 2,6-di-tert-butyl-p-cresol were prepared and tested at 70 degrees following the general procedure described in Example 1. The results were as follows:

| Stabilizer | Concentration (parts per million) | Color (Hazen Units) | | | | | | |
|---|---|---|---|---|---|---|---|---|
| | | Initial | 1 day | 4 days | 11 days | 2 wks. | 3 wks. | 6 wks. |
| 2,6-di-tert-butyl-p-cresol | 1 | 10 | 10 | 15 | 15 | 15 | 15 | 15 |
| Do | 10 | 10 | 10 | 15 | 15 | 15 | 15 | 15 |
| None | | 10 | 15 | 15 | 15 | >200 | | |

EXAMPLE 3

Samples were prepared following the procedure of Example 1, except that in place of tolylene diisocyanate, there was substituted 4,4'-methylenebis cyclohexyl isocyanate and the additives and concentrations were varied as shown below. The samples were placed in a constant temperature oven maintained at 66° and the color of the samples was observed at various intervals over a period of 6 weeks as shown below.

EXAMPLE 4

To determine the effect of color stabilization in accordance with the present invention, on polyurethane compositions, polyurethane pre-polymers were prepared as follows: 2850 parts of a commercial grade tolylene diisocyanate (Nacconate 80, Allied Chemical Corporation) and 1000 parts of a phosphorus containing polyol (Vircol 82, Mobil Chemical Corporation) were mixed and heated

| Stabilizer | Concentration (parts per million) | Color (Hazen Units) | | | | | |
|---|---|---|---|---|---|---|---|
| | | Initial | 1 day | 2 days | 4 days | 8 days | 14 days |
| None | | 5 | 40 | >200 | | | |
| Catechol | 10 | 5 | 5 | 20 | >200 | | |
| Do | 25 | 5 | 5 | 25 | 100 | >200 | |
| Do | 50 | 5 | 5 | 15 | 85 | >200 | |
| Do | 100 | 5 | 5 | 15 | >200 | | |
| 2,6-di-tert-butyl-p-cresol | 10 | 5 | 5 | 25 | 30 | 35 | 35 |
| Do | 25 | 5 | 5 | 20 | 25 | 35 | 35 |
| Do | 50 | 5 | 5 | 20 | 25 | 30 | 30 |
| Do | 100 | 5 | 5 | 20 | 25 | 30 | 30 | at 90° for a period of 1 hour, with agitation, under an atmosphere of nitrogen.

The polyurethane prepolymer thus prepared, after cooling to room temperature (25°) had a color rating on the Hazen scale of 160. A second prepolymer was similarly prepared except that the tolylene diisocyanate contained the 10 parts per million of 2,6-di-tert-butyl-p-cresol. The color of the stabilized prepolymer after cooling to room temperature was rated at 30 on the Hazen scale.

It will be seen from the above examples that the color stabilization achieved in accordance with the present invention is effective, not only in the isocyanate to which the color stabilizer is added, but also to polyurethane products prepared therefrom.

It will be apparent to those skilled in the art that many variations and modifications of the invention as here and above set forth may be made without departing from the spirit and scope of the invention. The invention is not limited to those details and applications described except as set forth in the appended claims.

We claim:

1. An organic polyisocyanate selected from the group consisting of ethylene diisocyanate, tetramethylene diisocyanate, hexamethylene diisocyanate, decamethylene diisocyanate, cyclohexyl diisocyanate, 4,4'-methylene bis (cyclohexylisocyanate), m - phenylene diisocyanate, p-phenylene diisocyanate, tolylene-2,4-diisocyanate, tolylene-2,6-diisocyanate, 4,4'-methylenebis (phenyl isocyanate), tolylene-2,4,6-triisocyanate, monochlorobenzene-2,4,6-triisocyanate, 2,3,5,6-tetramethyl-p-phenylene diisocyanate, xylene diisocyanate and mixtures thereof stabilized against discoloration by having incorporated therein a stabilizer consisting essentially of 2,6-di-tertiary-butyl-4-methyl phenol, the amount of said phenol incorporated being from about 0.0001 to 0.003 percent by weight.

2. An organic polyisocyanate composition as claimed in claim 1 wherein said polyisocyanate is selected from the group consisting of 2,4-tolylene diisocyanate, 2,6-tolylene diisocyanate and mixtures thereof.

3. An organic polyisocyanate composition as claimed in claim 1 wherein said polyisocyanate composition is 4,4'-methylene-bis-cyclohexylisocyanate.

4. An organic polyisocyanate composition as claimed in claim 1 wherein said stabilizer is present in an amount within the range of 0.0001 to 0.001 percent by weight of said organic polyisocyanate.

5. A process for stabilizing an organic polyisocyanate composition against discoloration, said polyisocyanate being selected from the group consisting of ethylene diisocyanate, tetramethylene diisocyanate, hexamethylene diisocyanate, decamethylene diisocyanate, cyclohexyl diisocyanate, 4,4'-methylenebis (cyclohexylisocyanate), m-phenylene diisocyanate, p-phenylene diisocyanate, tolylene-2,4-diisocyanate, tolylene - 2,6 - diisocyanate, 4,4'-methylenebis (phenyl isocyanate), tolylene-2,4,6-triisocyanate, monochlorobenzene - 2,4,6 - triisocyanate, 2,3,5,6-tetramethyl-p-phenylene diisocyanate, xylene diisocyanate and mixtures thereof, which comprises incorporating therein a stabilizer consisting essentially of 2,6-di-tertiary-butyl-4-methyl phenol, the amount of said phenol incorporated being from about 0.0001 to 0.003 percent by weight.

6. A process as claimed in claim 5 wherein said polyisocyanate is selected from the group consisting of 2,4-tolylene diisocyanate, 2,6-tolylene diisocyanate and mixtures thereof.

7. A process as claimed in claim 5 wherein said polyisocyanate is 4,4'-methylene-bis-cyclohexylisocyanate.

References Cited

UNITED STATES PATENTS

| | | | |
|---|---|---|---|
| 2,950,307 | 8/1960 | France et al. | 260—453 |
| 2,885,420 | 5/1959 | Spiegler | 260—453 |

FOREIGN PATENTS

| | | | |
|---|---|---|---|
| 1,030,394 | 5/1966 | Great Britain | 260—453 |

OTHER REFERENCES

Cooper et al.: Def. Pub. of Serial No. 594,371, filed Nov. 15, 1966, published in 856 O.G. 4, on Nov. 5, 1968.

FLOYD D. HIGEL, Primary Examiner

U.S. Cl. X.R.

260—77.5 CR, 77.5 AT